(12) United States Patent
Siddiqi et al.

(10) Patent No.: US 9,032,139 B2
(45) Date of Patent: May 12, 2015

(54) MEMORY ALLOCATION FOR FAST PLATFORM HIBERNATION AND RESUMPTION OF COMPUTING SYSTEMS

(71) Applicants: Faraz A. Siddiqi, Portland, OR (US); Francis R. Corrado, Newton, MA (US); Barnes Cooper, Tigard, OR (US)

(72) Inventors: Faraz A. Siddiqi, Portland, OR (US); Francis R. Corrado, Newton, MA (US); Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 13/730,575

(22) Filed: Dec. 28, 2012

(65) Prior Publication Data

US 2014/0189198 A1 Jul. 3, 2014

(51) Int. Cl.
G06F 12/02 (2006.01)
G06F 12/06 (2006.01)
G06F 12/08 (2006.01)

(52) U.S. Cl.
CPC .... *G06F 12/0246* (2013.01); *G06F 2212/1028* (2013.01); *G06F 12/0871* (2013.01); *G06F 12/0638* (2013.01)

(58) Field of Classification Search
CPC ............ G06F 12/0246; G06F 12/0638; G06F 12/0871; G06F 12/0873; G06F 2212/1028; G06F 2212/45; G06F 2212/7207
USPC ........................... 711/103, 129, 162, E12.008
See application file for complete search history.

(56) References Cited

U.S. PATENT DOCUMENTS

| | | |
|---|---|---|
| 6,131,166 A | 10/2000 | Wong-Insley |
| 6,901,298 B1 | 5/2005 | Govindaraj et al. |
| 6,968,469 B1 | 11/2005 | Fleischmann et al. |
| 7,100,037 B2 | 8/2006 | Cooper |
| 7,152,169 B2 | 12/2006 | Cooper et al. |
| 7,210,045 B2 | 4/2007 | Dunstan |
| 7,293,183 B2 | 11/2007 | Lee et al. |
| 7,310,725 B2 | 12/2007 | Zimmer et al. |
| 7,484,109 B2 | 1/2009 | Feldman et al. |
| 7,725,746 B2 | 5/2010 | Lee et al. |

(Continued)

FOREIGN PATENT DOCUMENTS

| | | |
|---|---|---|
| JP | 10-207588 | 8/1998 |
| JP | 10-320302 | 12/1998 |

(Continued)

OTHER PUBLICATIONS

Office Action from JP2010-540707 mailed Nov. 15, 2011, 6 pages.

(Continued)

*Primary Examiner* — Hal Schnee
(74) *Attorney, Agent, or Firm* — Blakely, Sokoloff, Taylor & Zafman LLP (57) ABSTRACT

Memory allocation for fast platform hibernation and resumption of computing systems. An embodiment of an apparatus includes logic at least partially implemented in hardware, the logic to: dynamically allocate at least a first portion of a nonvolatile memory; in response to a command to enter the apparatus into a standby state, the logic to store at least a portion of a context data from a volatile memory to the dynamically allocated first portion of the nonvolatile memory; and in response to a resumption of operation of the apparatus, the logic to copy at least the portion of the context data from the first portion of the nonvolatile memory to the volatile memory, and to reclaim the first portion of the nonvolatile memory for dynamic allocation.

23 Claims, 7 Drawing Sheets

(56) References Cited

U.S. PATENT DOCUMENTS

| | | | |
|---|---|---|---|
| 7,730,330 | B1 | 6/2010 | Fleischmann et al. |
| 7,971,071 | B2 | 6/2011 | Walkoe et al. |
| 7,971,081 | B2 * | 6/2011 | Cooper et al. ............... 713/320 |
| 8,694,814 | B1 * | 4/2014 | Salomon et al. ............. 713/323 |
| 2003/0233591 | A1 | 12/2003 | Chiteboun et al. |
| 2004/0003223 | A1 | 1/2004 | Fortin et al. |
| 2004/0025045 | A1 | 2/2004 | Chan |
| 2004/0034765 | A1 | 2/2004 | James |
| 2005/0149646 | A1 | 7/2005 | Kadatch et al. |
| 2006/0200691 | A1 | 9/2006 | Yomo et al. |
| 2007/0136523 | A1 | 6/2007 | Bonella et al. |
| 2007/0288687 | A1 | 12/2007 | Panabaker |
| 2009/0024843 | A1 * | 1/2009 | Choi ................................ 713/2 |
| 2009/0208002 | A1 | 8/2009 | Koehane et al. |
| 2009/0240954 | A1 | 9/2009 | Figueroa et al. |
| 2010/0037076 | A1 | 2/2010 | Reece et al. |
| 2010/0100747 | A1 | 4/2010 | Boscher et al. |
| 2010/0211731 | A1 | 8/2010 | Mittendorff et al. |
| 2011/0231595 | A1 * | 9/2011 | Wakrat et al. ................ 711/103 |
| 2012/0143877 | A1 | 6/2012 | Kumar et al. |
| 2013/0067137 | A1 * | 3/2013 | Molloy ......................... 711/103 |
| 2013/0173942 | A1 | 7/2013 | Forristal et al. |
| 2013/0212317 | A1 * | 8/2013 | Traister et al. ................ 711/103 |
| 2013/0290760 | A1 | 10/2013 | Cooper et al. |
| 2014/0164675 | A1 * | 6/2014 | Ehrlich et al. ................ 711/103 |

FOREIGN PATENT DOCUMENTS

| | | |
|---|---|---|
| JP | 2004-227085 | 8/2004 |
| JP | 2006-079468 | 3/2006 |
| KR | 20050040498 | 5/2005 |
| TW | 538333 | 6/2003 |

OTHER PUBLICATIONS

Office Action from DE Patent Application No. 112008003520.2-53 mailed Feb. 1, 2012 (+ English translation), 6 pages.

Office Action from CN Patent No. 200880123248.X mailed Nov. 24, 2011, 17 pages.

International Search Report and Written Opinion mailed May 4, 2012, in International Application No. PCT/US2011/054473, 9 pages.

"Advanced Configuration and Power Interface Specification", Hewlett-Packard Corporation et al., Revision 3.0b, Oct. 10, 2006 cover page, p. ii, pp. 402-415, (Oct. 10, 2006), 16 pages.

First Office Action (+ English translation) in Taiwan Patent Application No. 097147665, 21 pages.

"Intel® NAND Flash Memory for Intel® Turbo Memory White Paper", Intel Corporation, 2007, 8 pages.

International Search Report and Written Opinion in PCT/US2008/084710, mailed Apr. 28, 2009, 11 pages.

Office Action dated Aug. 2, 2012 (+ English translation), in Chinese Patent Application No. 200880123248.X., 6 pages.

Office Action dated May 15, 2013 (+ English translation), in Taiwan Patent Application No. 097147665, 4 pages.

Office Action mailed Apr. 4, 2014, in U.S. Appl. No. 13/340,558, 11 pages.

Advisory Action mailed Oct. 31, 2014, in U.S. Appl. No. 13/340,558, 4 pages.

Office Action mailed Aug. 11, 2014, in U.S. Appl. No. 13/340,558, 13 pages.

Office Action mailed Feb. 4, 2015 (+ English translation), in Taiwan Patent Application No. 101133497, 13 pages.

\* cited by examiner

MEMORY ALLOCATION FOR FAST PLATFORM HIBERNATION AND RESUMPTION OF COMPUTING SYSTEMS

TECHNICAL FIELD

Embodiments of the invention generally relate to the field of electronic devices and, more particularly, memory allocation for fast platform hibernation and resumption of computing systems.

BACKGROUND

Computing systems may be transferred between various power states. In general, each power state provides for the powering down of certain elements of the computing system during period of inactivity. Lower states generally provide further power savings, but also require additional time to return to operation.

For example, power states may include states referred to as S-states, including S3 and S4. S3, sometimes referred to as Standby, Sleep, or Suspend to RAM, is a sleep state in which the operating system (OS) of a computing system saves the context of the system into physical memory (dynamic random access memory, or DRAM) and puts the computing system into a suspend state. In this operation, open documents and programs (applications) (or a portion thereof) that were used at the time of entering into S3 are also saved in DRAM during the suspend state. Further, contents of some chipset registers may also be written to DRAM. The physical memory (DRAM) may be referred to as main memory or system memory. During the S3 state, power is removed from the platform hardware, with the exception of the DRAM and a small amount of circuitry used to later wake the system. The S3 power state provides a relatively fast suspend and resume (wake) time due to its ability to save and restore OS context and previously used programs and documents from high-speed DRAM memory.

S4, sometimes referred to as Hibernate, Safe Sleep, or Suspend to disk, provides that the OS context and open documents and programs (or a portion thereof) are saved on nonvolatile memory such as a hard disk drive (HDD) rather than in fast DRAM memory, where nonvolatile memory allows for persistent storage of data. This allows for higher power savings than the S3 state because the DRAM is not kept powered, but with higher latencies due to slow read and write access times of the HDD.

However, the implementation of operations for a fast platform hibernate and resume operation utilizes a static allocation of storage of data in nonvolatile memory. The implementation of fast platform hibernation operates to reduce the amount of such memory available for other uses because of the reservation of a portion of such memory for fast platform hibernate and resume operation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to memory allocation for fast platform hibernation and resumption of computing systems.

In some embodiments, an apparatus, system, or method (such as a computing apparatus, system, or method) provides an enhanced process for memory allocation for fast platform hibernation and resumption.

In operation, Fast Hibernate, or Fast Flash Standby (FFS), is a BIOS (Basic Input/Output System) module that works in tandem with a non-volatile memory such as a solid state drive (SSD) or hybrid SSD (including a combination of a hard drive and a solid state drive) to transparently treat a first power level, such as an S3 power level (generally referred to herein as a standby power level), as a second power level, such as an S4 or S5 power level (generally referred to herein as a hibernate power level). Computer platform hibernation and resumption is described in, for example, U.S. Pat. No. 7,971,081, "System and Method for Fast Platform Hibernate and Resume".

Power management logic or BIOS of an apparatus or system may include saving volatile system memory (such as DRAM, dynamic random-access memory) contents to a storage medium, such as a local hard disk drive, solid state drive, hybrid solid state drive, or other local or remote storage medium, in order to enter into a power mode that would otherwise cause volatile system memory data loss. In an example, the BIOS of a computing apparatus or system may include operating under the appearance (to the operating system, or OS) of an S3 system standby state, but in actuality the BIOS will save the memory contents to a storage medium and enter an S4 or S5 system hibernate state to provide larger power savings. In this manner, a fast hibernate process utilizes an operating system that is designed for the S3 state (being a first reduced power state) and the S4 or S5 state (being a second reduced power state), but not specifically designed for the fast hibernate process. This may occur by having the BIOS and/or another mechanism respond to a suspend to RAM (S3) command by putting the processor into a system management mode (SMM), and controlling the transfer from the DRAM system memory to the nonvolatile memory and then changing a sleep type to the hibernate state. Thus, the process may be transparent to the operating system.

In resuming operation, the nonvolatile memory contents are transferred to volatile memory to provide an appearance to the OS of a resumption from S3 as normal, rather than the S4 or S5 system hibernate state. Such a process, referred to as fast platform hibernation and resumption, allows for additional power savings without requiring a modification of the operating system.

However, in operation a dedicated portion of nonvolatile memory, such as a dedicated SSD/NAND partition, is required for each feature in a conventional system, without any dynamic sharing of storage space. Such a system does not address the cost associated with static/reserved storage for the Fast Hibernate feature, and makes the provisioning of memory usage across multiple features a multi-step and complicated manual process. In some embodiments, these issues are addressed by providing automatic provisioning of the dynamic allocation between Fast Hibernate and Storage Caching solutions.

In some embodiments, an apparatus, system, and method for fast hibernate and resume includes a dynamic and automated storage provisioning mechanism for the Fast Hibernate feature. In some embodiments, a mechanism provides for dynamic and reclaimable sharing of nonvolatile memory, such as NAND/SSD capacity (indicating NAND flash based solid state drive), between a storage caching feature and the fast hibernate mechanism. The dynamic allocation allows for the storage software or driver to allocate the needed NAND/SSD allocation for Fast Hibernate from anywhere within the caching volume. In some embodiments, the reclaimable attribute of the NAND/SSD allocation allows the fast hibernate feature to effectively share/borrow the common cache volume and upon resume from fast hibernate, return the allocation back to the storage driver or software. In this manner, the need to dedicate or reserve space on NAND/SSD for the fast hibernate feature is eliminated, thus providing a potential for reduced cost in terms of SSD capacity and for simplifying the NAND/SSD provisioning mechanism for the OEM (original equipment manufacturer) and end user. In some embodiments, a dynamic storage allocation mechanism allows for sharing of nonvolatile storage space between a fast hibernate feature and a storage caching feature, in both write through and write back caching modes.

For Fast Hibernate, a power management logic or BIOS locates a suitable nonvolatile storage medium, which may be a solid-state drive (SSD), hybrid solid state drive, hard disk drive (HDD), or other nonvolatile or persistent storage medium, and determines a location on the storage medium that is sufficiently large to hold memory (DRAM) contents for the fast hibernate process.

In a Fast Hibernate process, a hardware processor (such as a CPU (Central Processing Unit), an embedded processor, or other processor) or system software (such as BIOS or firmware) copies OS DRAM memory contents to the nonvolatile storage location, either directly or via indirect means such as device DMA (Direct Memory Access). For the purposes of this discussion, a NAND/SDD is described, but embodiments are not limited to this particular type of nonvolatile memory. In some embodiments, a fast platform hibernate process with dynamic storage allocation further includes the following:

(1) Upon a system boot or resume, storage driver software will automatically mark clean cached storage blocks for Fast Hibernate usage.

(2) The storage driver is to maintain a sufficient amount of low priority clean NAND/SSD cache pages for dynamic allocation.

(3) The storage driver provides a metadata structure at a specific location within its cache volume that maps dynamically allocated clean pages in a form of an LBA (logical block address) array.

(4) Upon the system performing a standby operation (entering a first low power state) in response to a command that is received, the Fast Hibernate feature (to provide a second low power state) detects the dynamic allocation presence via the metadata structure located on the NAND/SSD device.

(5) The Fast Hibernate feature locates and reads the dynamic allocation array blocks from SSD/NAND to DRAM.

(6) The Fast Hibernate feature writes the OS Standby (S3) state data (context data) to the dynamically allocated NAND/SSD blocks during hibernate suspend. The number of blocks that are actually written will be recorded in the metadata structure for later use by the storage driver upon resumption from hibernation.

In some embodiments, a resumption from hibernation includes the following:

(1) An event triggering resumption of operation of the computer platform occurs.

(2) Locating the storage medium used during the save process for the fast hibernate.

(3) The Fast Hibernate feature reads the OS Standby (S3) state data from the dynamically allocated NAND/SSD blocks and restores the DRAM to S3 resume ready state, copying the contents of the nonvolatile storage device back into volatile system memory, either directly or via indirect means, such as device DMA.

(4) Upon system resume from Fast Hibernate state, the storage driver reclaims the dynamic allocation by invalidating the cache contents corresponding to the blocks that were written.

(5) Upon reclaiming of dynamic allocation of an SSD, the storage driver trims any Fast Hibernate modified or used blocks, indicating that the storage driver notifies the SSD of the LBA of the blocks used in the hibernate process that are thus no longer valid.

In some embodiments, an apparatus, system, or method thus provides a dynamic allocation and sharing solution. In some embodiments, only as much data as was actually written is invalidated from the cache, and thus if the system never enters the S4 power state, there will be no change in cache contents.

In some embodiments, an apparatus, system, or method allows a computer platform to maintain low power consumption when the platform is put into sleep/hibernate state, while still providing a quick resume experience for the user when the fast hibernate is used, and providing flexibility in allocating use of nonvolatile memory as needed for different features.

Figure 1:
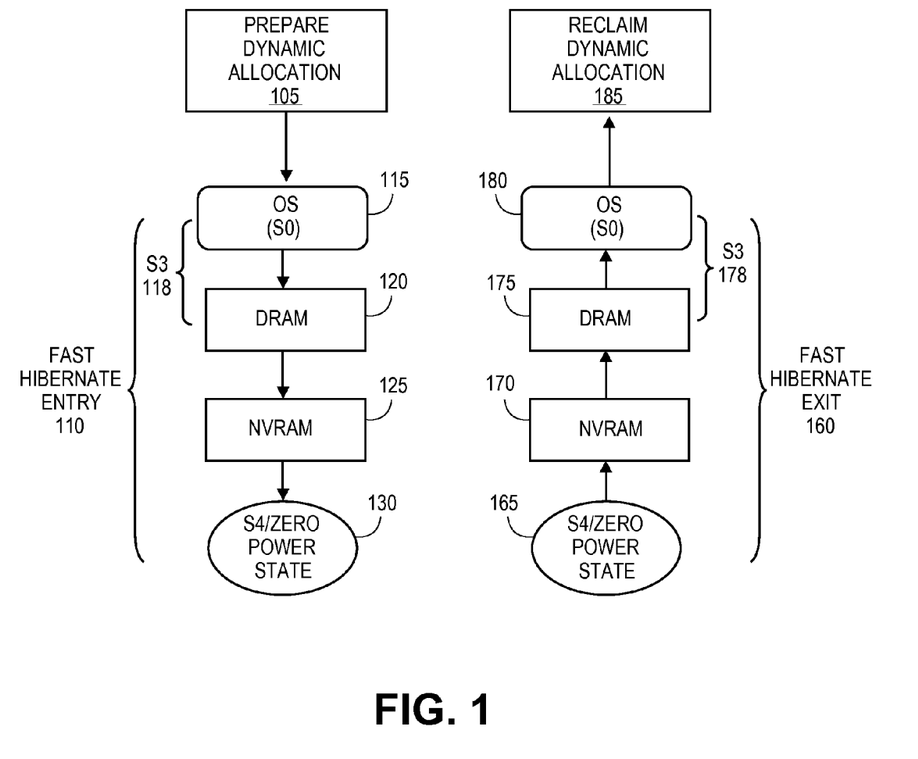
FIG. 1 illustrates embodiments of processes for a computer platform to enter into a fast hibernate state and to exit the fast hibernate state.

FIG. 1 illustrates embodiments of processes for a computer platform to enter into a fast hibernate state and to exit the fast hibernate state. In some embodiments, upon a reboot or system resume, a computer platform operates to prepare dynamic allocation of nonvolatile memory 105. In some embodiments, a storage driver will automatically mark clean cached storage blocks for Fast Hibernate usage. In some embodiments, the storage driver is to maintain a sufficient amount of low priority clean NAND/SSD cache pages for dynamic allocation, and provide a metadata structure to map dynamically allocated clean pages.

As shown in FIG. 1, the fast hibernate state entry 110 commences with an operating system at an operational (S0) 115 state transitioning to a sleep (S3 118) state, including the storing of context data to volatile DRAM memory 120. The fast hibernate process further includes copying or writing the context information from the DRAM to NVRAM 125, which provides for persistent storage of data. The storage to nonvolatile memory allows for transition of the platform to a hibernate (S4) state or, optionally, a zero power state 130. In some embodiments, the operating system is not aware of the transition of the platform to the hibernate state.

In some embodiments, the fast hibernate exit process 160 begins with S4 or zero power state 165. In some embodiments, upon waking of logic such as power management logic or BIOS, the content of the NVRAM 170 is to be restored to the DRAM 175. The loading of the context data into the DRAM 175 then puts the data in the proper location for restoring the context data using the standby state (S3 178) processes, thereby returning the operating system 180 to the operational (S0) state. In some embodiments, the computer platform provides for reclaiming the dynamic allocation of the NVRAM 185, wherein reclaims the dynamic allocation may include invalidating the cache contents corresponding to the number of blocks that were written and trims any Fast Hibernate modified or used blocks.

Figure 2:
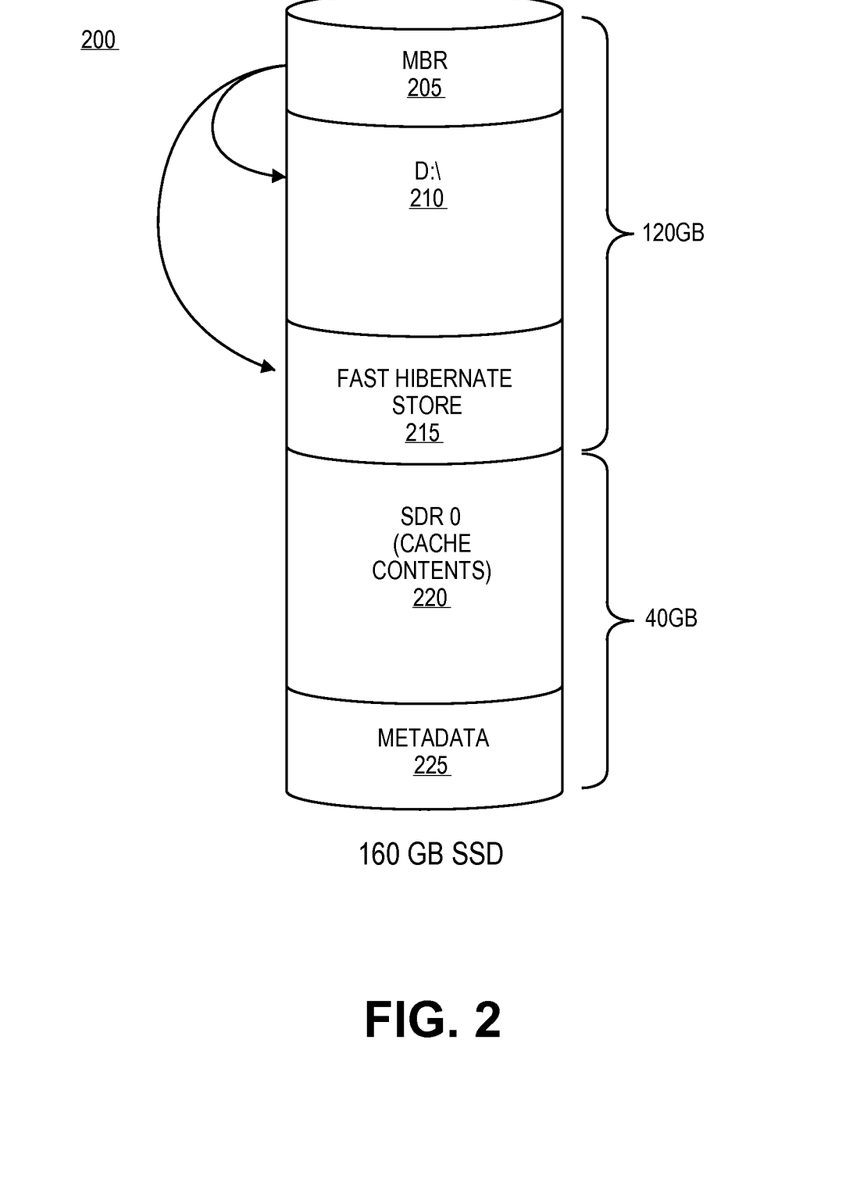
FIG. 2 illustrates a static allocation model for memory in a fast hibernate system.

FIG. 2 illustrates a static allocation model for memory in a fast hibernate system. In this illustration, a nonvolatile memory 200, which in this illustration is an SSD, includes a MBR (Master Boot Record) that defines allocation for partitions of the memory, includes a portion allocated for operation of Fast Hibernate Store 215, the memory being available for storage of data during a Fast Hibernate operation. However, the static allocation of such memory reduces the amount of memory available for user access, indicated here as the D:\ drive 210. Also is SDR 0 for cache contents and metadata 225.

In some embodiments, in contrast to the static allocation of memory 215 for Fast Hibernate function, the SSD instead is utilized for dynamic allocation of memory, where the memory utilized for Fast Hibernate is released after utilization, and may then be applied to other uses.

Figure 3:
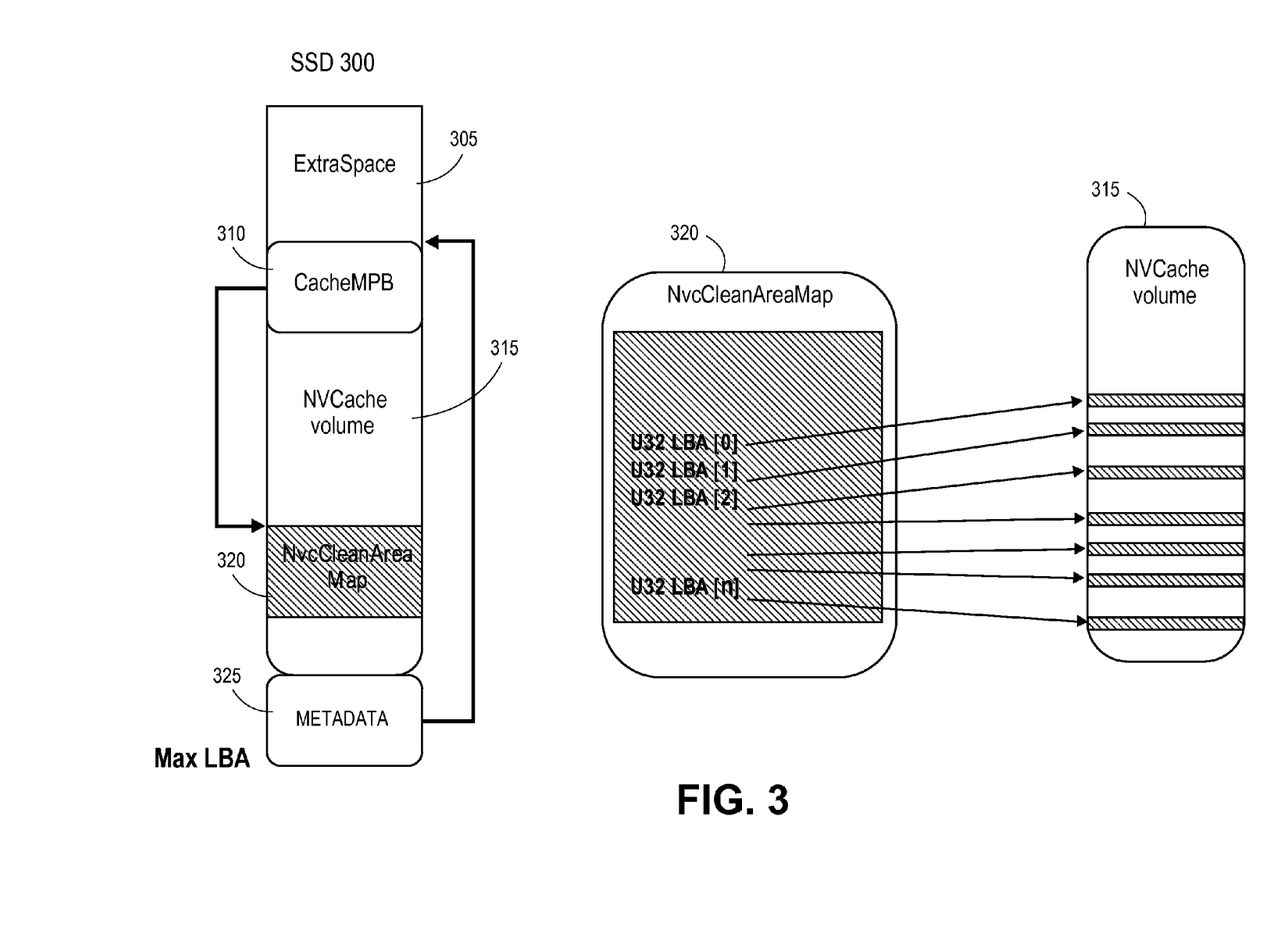
FIG. 3 illustrates dynamic memory allocation according to an embodiment for fast hibernate.

FIG. 3 illustrates dynamic memory allocation according to an embodiment for fast hibernate operation. In some embodiments, a nonvolatile memory such as SSD 300 includes extra space 305, a cache MPB (Message Passing Buffer) 310, an NV (NonVolatile) Cache volume 315, an Nvc (Nonvolatile cache) Clean Area Map 320, and metadata 325.

In some embodiments, the metadata 325 maintains the Nvc Clean Area Map 320 at a specific location within the cache volume 315, where the Nvc Clean Area Map maps dynamically allocated clean pages in a form of an LBA array. This is illustrated by LBA [0] through LBA [n], which are shown to map to locations in the NV cache volume 315.

Figure 4:
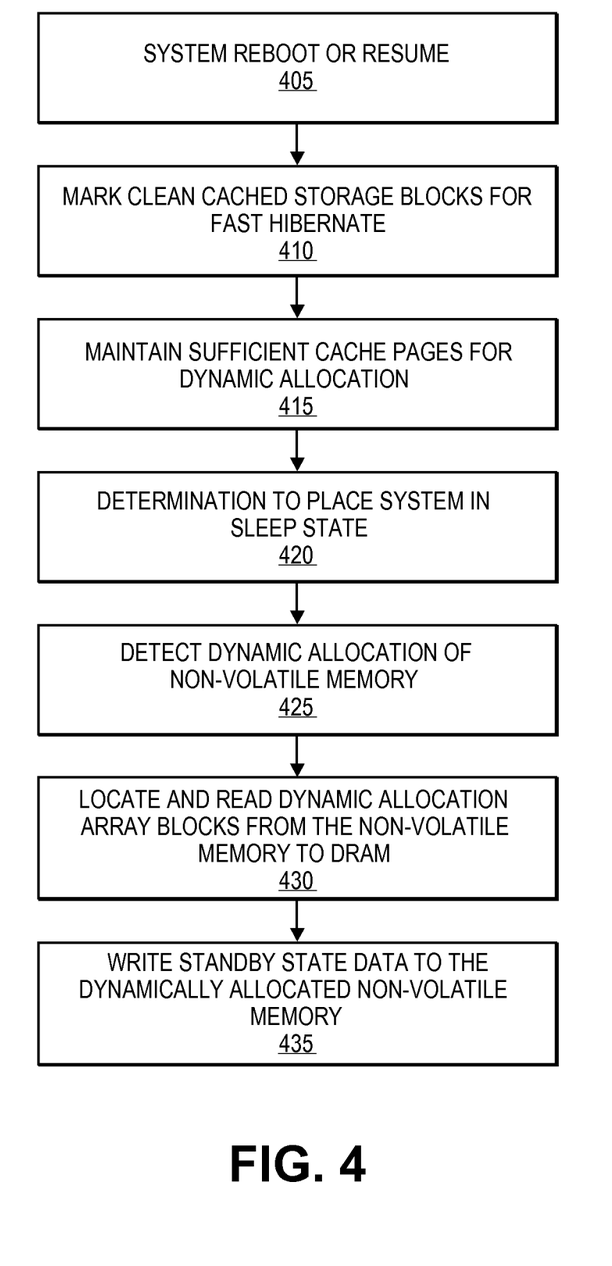
FIG. 4 is a flow chart to illustrate an embodiment of a process for dynamic allocation for fast hibernate of a computer platform.

FIG. 4 is a flow chart to illustrate an embodiment of a process for dynamic allocation for fast hibernate of a computer platform. In some embodiments, a system boot or resume may occur 405, whereupon clean cached blocks for a Fast Hibernate process are marked 410, with a sufficient number of cache pages for dynamic allocation being maintained 415.

A BIOS or system may determine to put the computer platform into a sleep state 420. In some embodiments, the dynamic allocation of nonvolatile memory may be detected 425, and the dynamic allocation array blocks read from the nonvolatile memory to the DRAM 430. In some embodiments, the standby state data (context data) is written to the dynamically allocated nonvolatile memory 435.

Figure 5:
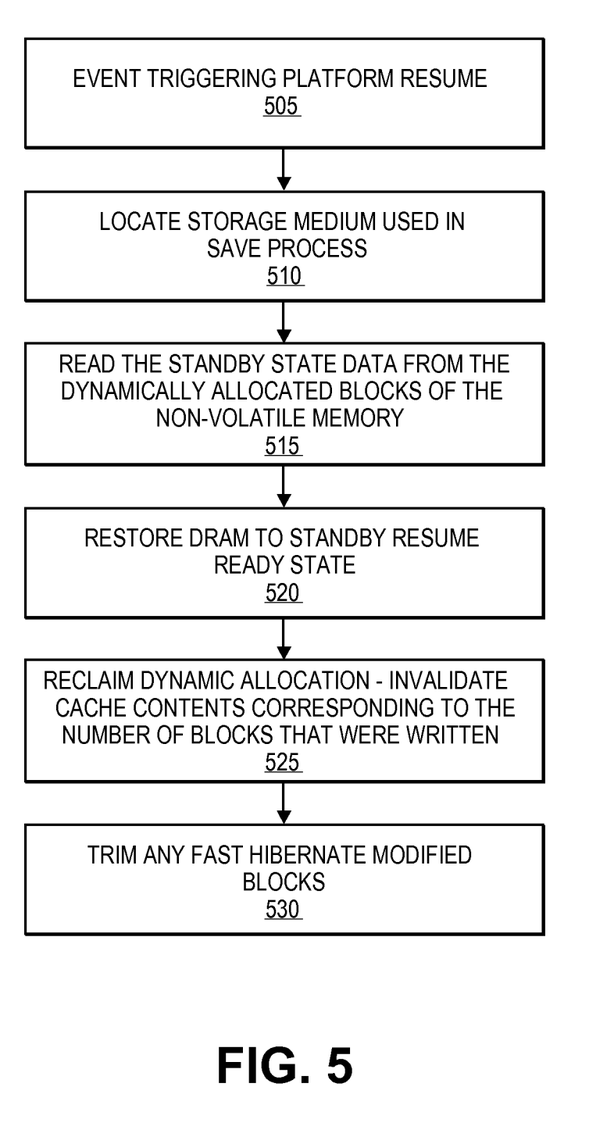
FIG. 5 is a flow chart to illustrate an embodiment of a process for resumption of a computer platform after a fast hibernate using dynamically allocated memory.

FIG. 5 is a flow chart to illustrate an embodiment of a process for resumption of a computer platform after a fast hibernate using dynamically allocated memory. In this illustration, an event occurs that triggers a resumption of the computer platform 505, and the computer system locates the storage medium used during the save process for the fast hibernate process 510. In some embodiments, the standby state data is read from the dynamically allocated memory 515, and the DRAM is restored to standby resume ready data 520, with the contents of the nonvolatile memory being copied back into the volatile memory system.

Figure 6:
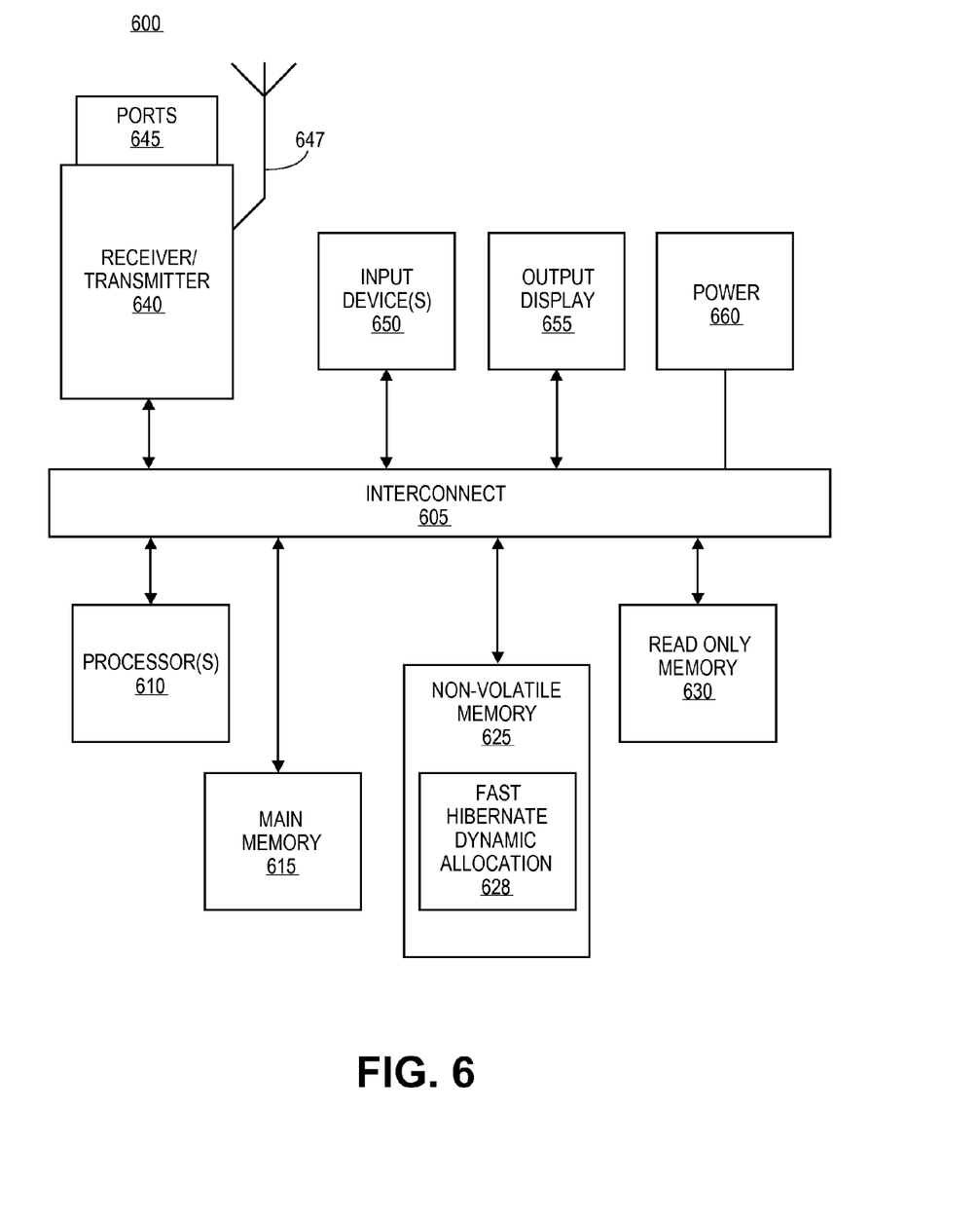
FIG. 6 illustrates an embodiment of a computing system that provides for fast platform hibernation and resumption including dynamic allocation of memory.

In some embodiments, upon the system resume from the fast hibernate state, the dynamic allocation of the nonvolatile memory is reclaimed, with the cache contents that correspond to the blocks to which the hibernate data was written being invalidated 525. In an operation in which a nonvolatile memory is an SSD, there may be a TRIM command by which the SSD is informed of the associated LBAs that are no longer valid 530, FIG. 6 illustrates an embodiment of a computing system that provides for fast platform hibernation and resumption including dynamic allocation of memory. In this illustration, certain standard and well-known components that are not germane to the present description are not shown. Under some embodiments, the computing system 600 comprises an interconnect or crossbar 605 or other communication means for transmission of data. The computing system 600 may include a processing means such as one or more processors 610 coupled with the interconnect 605 for processing information. The processors 610 may comprise one or more physical processors and one or more logical processors. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers.

In some embodiments, the computing system 600 further comprises a random access memory (RAM) or other dynamic storage device or element as a main memory 615 for storing information and instructions to be executed by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 600 may include one or more nonvolatile memory elements 625 for the storage of certain elements, such as an SSD or HDD. In some embodiments, the nonvolatile memory elements 625 include nonvolatile memory for the storage of context data in a fast hibernation process. In some embodiments, the computing system 600 includes dynamic allocation 628 of the nonvolatile memory for certain purposes, including allocation for Fast Hibernate operation.

The computing system 600 also may comprise a read only memory (ROM) 630 or other static storage device for storing static information and instructions for the processors 610.

One or more transmitters or receivers 640 may also be coupled to the interconnect 605. In some embodiments, the computing system 600 may include one or more ports 645 for the reception or transmission of data. The computing system 600 may further include one or more omnidirectional or directional antennas 647 for the reception of data via radio signals.

The computer system 600 may further include one or more input devices 650, such as a keyboard, mouse or other pointing device, a microphone for audio commands, and other input devices.

The computing system 600 may also be coupled via the interconnect 605 to an output display 655. In some embodiments, the display 655 may include a liquid crystal display (LCD) or any other display technology, for displaying information or content to a user. In some environments, the display 655 may include a touch-screen that is also utilized as at least a part of an input device. In some environments, the display 655 may be or may include an audio device, such as a speaker for providing audio information.

The computing system 600 may also comprise a power device or system 660, which may comprise a power supply, a battery, a solar cell, a fuel cell, or other system or device for providing or generating power. The power provided by the power device or system 660 may be distributed as required to elements of the computing system 600. In some embodiments, the power system 660 may include or may work with a power management logic, where such power management logic may provide for functions or processes connected with a fast platform hibernate and resumption.

Figure 7:
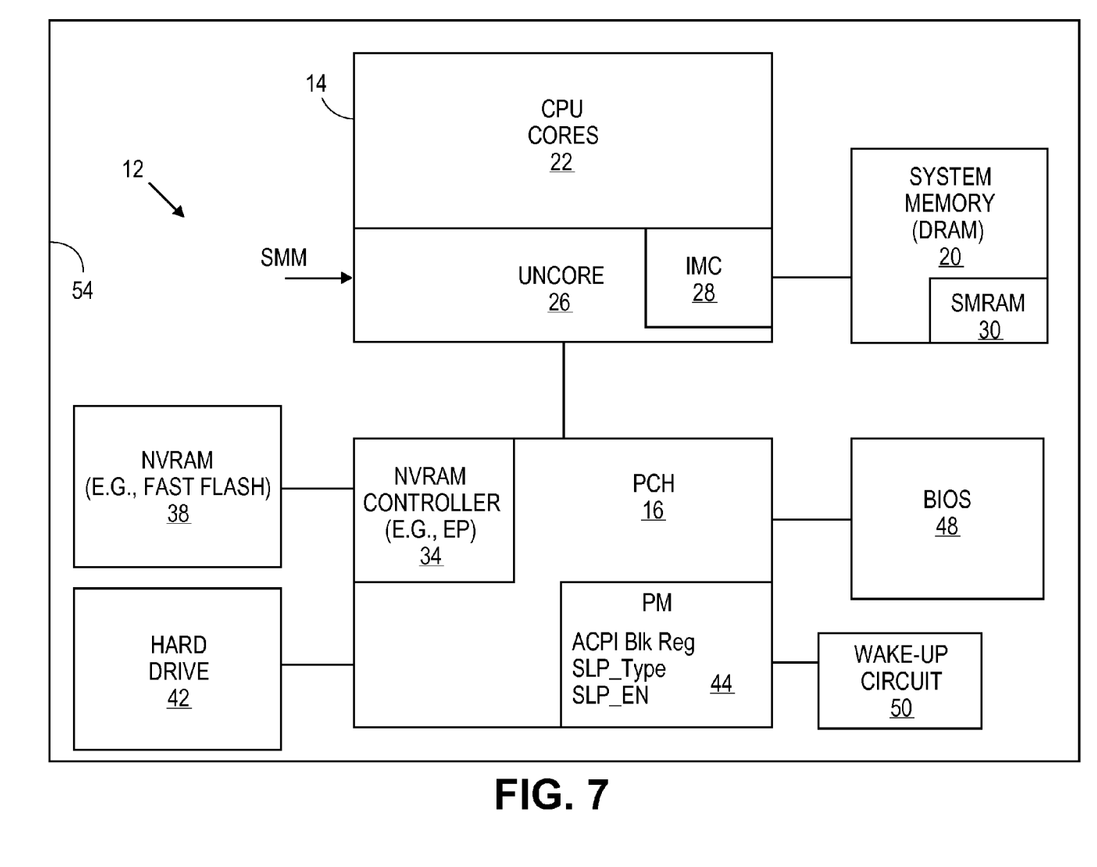
FIG. 7 illustrates an apparatus or system for fast hibernate operation according to an embodiment.

FIG. 7 illustrates an apparatus or system for fast hibernate operation according to an embodiment. In this illustration, a system 12 includes a processor 14 coupled to a platform controller hub (PCH) 16 and a system memory (DRAM) 20. Processor 14 includes central processor unit (CPU) cores 22 and an uncore 26. The term uncore is not intended to have a restricted definition, but is a general term to refer to parts of the processor with various interface and control circuits that are not part of the core. Uncore 26 includes an integrated memory controller 28 to control system memory 20. System memory 20 includes a portion 30 for holding instructions for a system management mode (SMM). The SMM may be according to known SMM techniques or new SMM techniques or a similar type of mode.

A nonvolatile memory (NVRAM) 38 is coupled to a PCH 16 through a controller 34. In some embodiments, NVRAM 38 includes Fast Flash and controller 34 is a NAND controller. In some embodiments, NVRAM is an SDD or hybrid SSD. In some embodiments, portions of the NVRAM may be dynamically allocated to certain purposes, including allocation for a Fast Hibernate feature.

In some embodiments, controller 34 may be an embedded processor. A hard drive 42 is coupled to PCH 16 and holds an operating system, programs, and data for processor 14. In some embodiments, some of the contents of the hard drive 42 can be used by other components of the system. NVRAM 38 has less storage capacity than hard drive 42, but has a quicker access than hard drive 42. Accordingly, NVRAM 38 may be referred to as a smaller nonvolatile memory, and hard drive 42 may be referred to as a larger nonvolatile memory. Basic input/output system (BIOS) 48 provides system BIOS instructions. A wake up circuit 50 may be powered during hibernate to allow resume. In some embodiments, the components of the system of FIG. 7 are held in a case 52, such as with a mobile computer.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

In some embodiments, an apparatus includes logic at least partially implemented in hardware, the logic to: dynamically allocate at least a first portion of a nonvolatile memory; in response to a command to enter the apparatus into a standby state, the logic to store at least a portion of a context data from a volatile memory to the dynamically allocated first portion of the nonvolatile memory; and in response to a resumption of operation of the apparatus, the logic to copy at least the portion of the context data from the first portion of the nonvolatile memory to the volatile memory, and to reclaim the first portion of the nonvolatile memory for dynamic allocation.

In some embodiments, the logic includes at least a processor.

In some embodiments, the nonvolatile memory is a solid state drive or a hybrid solid state drive. In some embodiments, the volatile memory is dynamic random access memory (DRAM).

In some embodiments, the nonvolatile memory is to provide dynamic allocation for a storage cache operation.

In some embodiments, the nonvolatile memory includes a map of dynamically allocated clean pages, the map including logical block addresses (LBAs) of the pages. In some embodiments, the nonvolatile memory is to record which blocks of memory of the dynamically allocated first portion of the nonvolatile memory context data was written. In some embodiments, the reclaiming of the first portion of the nonvolatile memory includes the logic to invalidate cache contents to the blocks of memory to which context data was written.

In some embodiments, the apparatus further includes power management logic to control power management for the apparatus.

In some embodiments, a method includes dynamically allocating a first portion of nonvolatile memory of a computer platform; upon receiving a standby command for the computer platform, locating the first portion of the nonvolatile memory; writing at least a portion of a context data from a volatile memory to the first portion of the nonvolatile memory; upon receiving a resume command for the computer platform, copying at least the portion of context data from the nonvolatile memory to the volatile memory; and reclaiming the first portion of the nonvolatile memory for dynamic allocation.

In some embodiments, the method further includes mapping dynamically allocated clean pages of the nonvolatile memory.

In some embodiments, the method further includes recording which blocks of memory context data is written. In some embodiments, reclaiming of the first portion of the nonvolatile memory includes invalidating cache contents to the blocks of memory to which context data was written. In some embodiments, the method further includes notifying the nonvolatile memory of the blocks of memory that are no longer valid.

In some embodiments, the method further includes maintaining a sufficient amount of low priority clean cache pages for dynamic allocation.

In some embodiments, a system includes a processor to operate utilizing an operating system; a volatile memory to store data, the volatile memory being a synchronous dynamic random access memory (SDRAM); a non-volatile memory to persistently store data, the computer system to dynamically allocate portions of the non-volatile memory for a fast hibernation feature and for a storage cache feature; and power management logic to control power management for the system. In some embodiments, in response to a command to enter a standby state, the fast hibernate feature includes the system to store at least a portion of a context data from the volatile memory to a dynamically allocated first portion of the nonvolatile memory. In some embodiments, in response to a resumption of operation of the system, the system is to resume from the fast hibernate feature including the system to copy at least the portion of context data from the first portion of the nonvolatile memory to the volatile memory, and to reclaim the first portion of the nonvolatile memory for dynamic allocation.

In some embodiments, wherein the operating system of the system is not aware of the operation of the fast hibernate feature.

In some embodiments, the nonvolatile memory is to provide a metadata structure at a location within a cache volume. In some embodiments, the metadata structure is to include a map of dynamically allocated clean pages, the map to include logical block addresses (LBAs) of the pages. In some embodiments, the nonvolatile memory is to record in the metadata structure which blocks of memory of the dynamically allocated first portion of the nonvolatile memory context data were written. In some embodiments, the reclaiming of the first portion of the nonvolatile memory includes the system to invalidate cache contents to the blocks of memory to which context data was written.

In some embodiments, a computer-readable storage medium having stored thereon data representing sequences of instructions that, when executed by a processor, cause the processor to perform operations including dynamically allocating a first portion of nonvolatile memory of a computer platform; upon receiving a standby command for the computer platform, locating the first portion of the nonvolatile memory; writing at least a portion of a context data from a volatile memory to the first portion of the nonvolatile memory; upon receiving a resume command for the computer platform, copying at least the portion of context data from the nonvolatile memory to the volatile memory; and reclaiming the first portion of the nonvolatile memory for dynamic allocation.

In some embodiments, the medium includes instructions that, when executed by the processor, cause the processor to perform operations including mapping dynamically allocated clean pages of the nonvolatile memory.

In some embodiments, the medium includes instructions that, when executed by the processor, cause the processor to perform operations including recording which blocks of memory context data is written.

In some embodiments, reclaiming of the first portion of the nonvolatile memory includes invalidating cache contents to the blocks of memory to which context data was written.

In some embodiments, the medium includes instructions that, when executed by the processor, cause the processor to perform operations including the nonvolatile memory of the blocks of memory that are no longer valid.

In some embodiments, the medium includes instructions that, when executed by the processor, cause the processor to perform operations including maintaining a sufficient amount of low priority clean cache pages for dynamic allocation.

What is claimed is:

1. An apparatus comprising:
   logic at least partially implemented in hardware, the logic to:
   upon boot or resume of the apparatus, dynamically allocate at least a first portion of a nonvolatile memory for hibernation of the apparatus, the first portion being within a partition of the nonvolatile memory dynamically shared with allocation for a storage cache operation, wherein dynamically allocating the first portion includes marking only clean cached blocks within the shared partition;

in response to a command to enter the apparatus into a standby state and storing of context data in a volatile memory for the standby state, the logic to change the standby state to a hibernate state in a fast hibernate feature, store at least a portion of the context data from a volatile memory to the dynamically allocated first portion of the nonvolatile memory for hibernation of the apparatus, and record blocks of the first portion of the nonvolatile memory to which the context data is actually written; and in response to a resumption of operation of the apparatus, the logic to locate the first portion of the nonvolatile memory, copy at least the portion of the context data from the first portion of the nonvolatile memory to the volatile memory, and reclaim the first portion of the nonvolatile memory for dynamic allocation, wherein reclaiming of the first portion of the nonvolatile memory for dynamic allocation includes the logic to invalidate cache contents of only the blocks of the nonvolatile memory to which context data was written.

2. The apparatus of claim 1, wherein the logic comprises at least a processor.

3. The apparatus of claim 1, wherein the nonvolatile memory is a solid state drive or a hybrid solid state drive.

4. The apparatus of claim 1, wherein the volatile memory is dynamic random access memory (DRAM).

5. The apparatus of claim 1, wherein the nonvolatile memory includes a metadata structure in a specific location, the metadata structure including a map of dynamically allocated clean pages of the shared partition, the map including logical block addresses (LBAs) of the dynamically allocated clean pages of the shared partition.

6. The apparatus of claim 1, further comprising power management logic to control power management for the apparatus.

7. The apparatus of claim 1, wherein the logic is further to maintain a number of low priority clean cache pages in the shared partition for dynamic allocation.

8. The apparatus of claim 1, wherein an operating system of the apparatus is not aware of the operation of the fast hibernate feature.

9. The apparatus of claim 1, wherein a storage driver for the nonvolatile memory is to mark the clean cached blocks within the shared partition, maintain the low priority clean cache pages for dynamic allocation, and reclaim the first portion of the nonvolatile memory for dynamic allocation.

10. The apparatus of claim 9, wherein the storage driver is further to trim modified or used blocks upon reclaiming the first portion of the nonvolatile memory.

11. A method comprising:

upon boot or resume of a computer platform, dynamically allocating a first portion of nonvolatile memory of a computer platform for hibernation of the computer platform, the first portion being within a partition of the nonvolatile memory dynamically shared with allocation for a storage cache operation, wherein dynamically allocating the first portion includes marking only clean cached blocks within the shared partition;

upon receiving a standby command for the computer platform and storing of context data in a volatile memory for a standby state, changing the standby state to a hibernate state in a fast hibernate feature and locating the first portion of the nonvolatile memory;

writing at least a portion of the context data from the volatile memory to the first portion of the nonvolatile memory for hibernation of the apparatus, and recording blocks of the first portion of the nonvolatile memory to which the context data is actually written;

upon receiving a resume command for the computer platform, locating the first portion of the nonvolatile memory and copying at least the portion of context data from the nonvolatile memory to the volatile memory; and reclaiming the first portion of the nonvolatile memory for dynamic allocation, wherein reclaiming of the first portion of the nonvolatile memory for dynamic allocation includes invalidating cache contents of only the blocks of the nonvolatile memory to which context data was written.

12. The method of claim 11, further comprising mapping dynamically allocated clean pages of the nonvolatile memory.

13. The method of claim 11, further comprising notifying the nonvolatile memory of the blocks of memory that are no longer valid.

14. The method of claim 11, further comprising maintaining a number of low priority clean cache pages in the shared partition for dynamic allocation.

15. A system comprising:

a processor to operate utilizing an operating system;

a volatile memory to store data, the volatile memory being a synchronous dynamic random access memory (SDRAM);

a non-volatile memory to persistently store data, the system to dynamically allocate portions of the non-volatile memory for a fast hibernation feature and for a storage cache feature within a shared partition, including, upon boot or resume of the system, the system to dynamically allocate a first portion within the shared partition for hibernation of the system, wherein dynamically allocating the first portion includes marking only clean cached blocks within the shared partition; and power management logic to control power management for the system;

wherein, in response to a command to enter a standby state and storing of context data in the volatile memory for the standby state, the fast hibernate feature includes the system to change the standby state to a hibernate state, store at least a portion of the context data from the volatile memory to the dynamically allocated first portion of the nonvolatile memory for hibernation of the system, and record blocks of the first portion of the nonvolatile memory to which the context data is actually written; and wherein, in response to a resumption of operation of the system, the system is resume from the fast hibernate feature including the system to locate the first portion of the nonvolatile memory, copy at least the portion of context data from the first portion of the nonvolatile memory to the volatile memory, and reclaim the first portion of the nonvolatile memory for dynamic allocation, wherein reclaiming of the first portion of the nonvolatile memory for dynamic allocation includes the logic to invalidate cache contents of only the blocks of the nonvolatile memory to which context data was written.

16. The system of claim 15, wherein the operating system is not aware of the operation of the fast hibernate feature.

17. The system of claim 15, wherein the nonvolatile memory is to provide a metadata structure at a location within a cache volume.

18. The system of claim 17, wherein the metadata structure is to include a map of dynamically allocated clean pages of the shared partition, the map to include logical block addresses (LBAs) of the dynamically allocated clean pages of the shared partition.

19. The system of claim 15, wherein the system is further to maintain a number of low priority clean cache pages in the shared partition for dynamic allocation.

20. A non-transitory computer-readable storage medium having stored thereon data representing sequences of instructions that, when executed by a processor, cause the processor to perform operations comprising:

upon boot or resume of a computer platform, dynamically allocating a first portion of nonvolatile memory of a computer platform for hibernation of the computer platform, the first portion being within a partition of the nonvolatile memory dynamically shared with allocation for a storage cache operation, wherein dynamically allocating the first portion includes marking only clean cached blocks within the shared partition;

upon receiving a standby command for the computer platform and storing of context data in a volatile memory for a standby state, changing the standby state to a hibernate state in a fast hibernate feature and locating the first portion of the nonvolatile memory;

writing at least a portion of the context data from the volatile memory to the first portion of the nonvolatile memory for hibernation of the apparatus, and recording blocks of the first portion of the nonvolatile memory to which the context data is actually written;

upon receiving a resume command for the computer platform, locating the first portion of the nonvolatile memory and copying at least the portion of context data from the nonvolatile memory to the volatile memory; and reclaiming the first portion of the nonvolatile memory for dynamic allocation, wherein reclaiming of the first portion of the nonvolatile memory for dynamic allocation includes invalidating cache contents of only the blocks of the nonvolatile memory to which context data was written.

21. The medium of claim 20, further comprising instructions that, when executed by the processor, cause the processor to perform operations comprising:

mapping dynamically allocated clean pages of the nonvolatile memory.

22. The medium of claim 20, further comprising instructions that, when executed by the processor, cause the processor to perform operations comprising:

notifying the nonvolatile memory of the blocks of memory that are no longer valid.

23. The medium of claim 20, further comprising instructions that, when executed by the processor, cause the processor to perform operations comprising:

maintaining a number of low priority clean cache pages in the shared partition for dynamic allocation.

* * * * *